(12) United States Patent
Picard (10) Patent No.: US 8,787,210 B2
(45) Date of Patent: Jul. 22, 2014

(54) FIRMWARE DOWNLOAD WITH ADAPTIVE LOST PACKET RECOVERY
(71) Applicant: Itron, Inc., Liberty Lake, WA (US)
(72) Inventor: Gilles Picard, Thiais (FR)
(73) Assignee: Itron, Inc., Liberty Lake, WA (US)
( * ) Notice: Subject to any disclaimer, the term of this patent is extended or adjusted under 35 U.S.C. 154(b) by 0 days.
(21) Appl. No.: 13/833,252
(22) Filed: Mar. 15, 2013
(65) Prior Publication Data
US 2013/0208627 A1 Aug. 15, 2013

Related U.S. Application Data
(63) Continuation-in-part of application No. 13/780,001, filed on Feb. 28, 2013, which is a continuation of
(Continued)

(51) Int. Cl.
| | |
|---|---|
| G06F 9/44 | (2006.01) |
| H04L 1/18 | (2006.01) |
| G01D 4/00 | (2006.01) |
| H04W 8/00 | (2009.01) |
| H04L 12/26 | (2006.01) |
| H04L 12/56 | (2006.01) |
| H04L 12/24 | (2006.01) |
| G08C 19/16 | (2006.01) |
| H04L 1/00 | (2006.01) |
| H04W 40/10 | (2009.01) |
| H04W 48/12 | (2009.01) |
| H04W 84/18 | (2009.01) |
| H04W 8/24 | (2009.01) |

(52) U.S. Cl.
CPC ....... H04L 41/082 (2013.01); *H04L 2001/0093* (2013.01); *Y04S 20/322* (2013.01); H04L 1/1812 (2013.01); *H04W 40/10* (2013.01); *H04W 48/12* (2013.01); G01D 4/006 (2013.01); *Y02B 90/243* (2013.01); *H04W 84/18* (2013.01); *Y02B 90/246* (2013.01); *Y04S 20/325* (2013.01); *Y04S 20/42* (2013.01); H04W 8/005 (2013.01); *H04L 1/0057* (2013.01); H04L 43/0835 (2013.01); G01D 4/004 (2013.01); H04L 45/127 (2013.01); *Y02B 90/242* (2013.01); *H04W 8/245* (2013.01); G08C 19/16 (2013.01)
USPC .......................................... 370/255; 717/172

(58) Field of Classification Search
CPC ... H04L 41/082; H04L 45/127; H04L 1/1812; H04L 2001/0093; H04L 43/0835; H04L 1/0057; G08C 19/16; Y02B 90/242; Y02B 90/243; Y02B 90/246; Y04S 20/325; Y04S 20/322; Y04S 20/42; H04W 40/10; H04W 84/18; H04W 8/005; H04W 8/245; H04W 48/12; G01D 4/006; G01D 4/004
USPC ........... 370/255, 406; 717/168, 171, 172, 173
See application file for complete search history.

(56) References Cited

U.S. PATENT DOCUMENTS

| | | |
|---|---|---|
| 4,799,062 A | 1/1989 | Sanderford, Jr. et al. |
| 4,977,577 A | 12/1990 | Arthur et al. |

(Continued)

FOREIGN PATENT DOCUMENTS

| | | |
|---|---|---|
| WO | WO 03/015452 | 2/2003 |
| WO | WO 03/090411 A1 | 10/2003 |

(Continued)

OTHER PUBLICATIONS

Luigi Iannone et al., "Cross-Layer Routing in Wireless Mesh Networks", Université Pierre et Marie Curie (no date available).

(Continued)

Primary Examiner — Brian D Nguyen
(74) Attorney, Agent, or Firm — Dority & Manning, P.A.

(57) ABSTRACT

Disclosed are methodologies for implementing a firmware download to endpoints in a mesh network. A firmware package is divided into a number of blocks, each block containing a number of packets and sent as a broadcast to endpoints in a wireless mesh network. A number of redundancy packets are sent to permit calculation of lost packets. A maximum number of redundancy packets to be sent is determined and a forward error correction code is developed depending on the maximum number of redundancy packets and the total number of firmware packets to be sent. A first block of redundancy packets, less than the maximum number, is sent followed by additional blocks of redundancy packets depending on reports from the receiving endpoints.

27 Claims, 9 Drawing Sheets

Related U.S. Application Data application No. 12/902,853, filed on Oct. 12, 2010, now Pat. No. 8,391,177, which is a continuation of application No. 11/900,202, filed on Sep. 10, 2007, now Pat. No. 7,843,834.

(60) Provisional application No. 60/845,056, filed on Sep. 15, 2006, provisional application No. 60/845,994, filed on Sep. 20, 2006.

(56) References Cited

U.S. PATENT DOCUMENTS

| | | | |
|---|---|---|---|
| 4,998,102 A | 3/1991 | Wyler et al. | |
| 5,005,142 A | 4/1991 | Lipchak et al. | |
| 5,067,136 A | 11/1991 | Arthur et al. | |
| 5,095,493 A | 3/1992 | Arthur et al. | |
| 5,119,396 A | 6/1992 | Snderford, Jr. | |
| 5,166,927 A | 11/1992 | Iida et al. | |
| 5,198,796 A | 3/1993 | Hessling, Jr. | |
| 5,265,120 A | 11/1993 | Sanderford, Jr. | |
| 5,310,075 A | 5/1994 | Wyler | |
| 5,311,541 A | 5/1994 | Sanderford, Jr. | |
| 5,377,222 A | 12/1994 | Sanderford, Jr. | |
| 5,377,232 A | 12/1994 | Davidov et al. | |
| 5,457,713 A | 10/1995 | Sanderford, Jr. et al. | |
| 5,486,805 A | 1/1996 | Mak | |
| 5,509,027 A | 4/1996 | Vook et al. | |
| 5,598,427 A | 1/1997 | Arthur et al. | |
| 5,604,768 A | 2/1997 | Fulton | |
| 5,626,755 A | 5/1997 | Keyser et al. | |
| 5,661,750 A | 8/1997 | Fulton | |
| 5,668,828 A | 9/1997 | Sanderford, Jr. et al. | |
| 5,696,441 A | 12/1997 | Mak et al. | |
| RE35,829 E | 6/1998 | Sanderford, Jr. | |
| 5,802,311 A * | 9/1998 | Wronski | 709/236 |
| 5,907,491 A | 5/1999 | Canada et al. | |
| 5,907,559 A | 5/1999 | Shuman et al. | |
| 5,920,589 A | 7/1999 | Rouquette et al. | |
| 5,926,531 A | 7/1999 | Petite | |
| 5,933,072 A | 8/1999 | Kelley | |
| 5,953,368 A | 9/1999 | Sanderford et al. | |
| 5,987,058 A | 11/1999 | Sanderford et al. | |
| 6,028,522 A | 2/2000 | Petite | |
| 6,031,883 A | 2/2000 | Sanderford, Jr. et al. | |
| 6,044,062 A | 3/2000 | Brownrigg et al. | |
| 6,047,016 A | 4/2000 | Ramberg et al. | |
| 6,078,251 A | 6/2000 | Landt et al. | |
| 6,088,689 A | 7/2000 | Kohn et al. | |
| 6,100,816 A | 8/2000 | Moore | |
| 6,163,276 A | 12/2000 | Irving et al. | |
| 6,178,197 B1 | 1/2001 | Froelich et al. | |
| 6,181,258 B1 | 1/2001 | Summers et al. | |
| 6,195,018 B1 | 2/2001 | Ragle et al. | |
| 6,204,808 B1 | 3/2001 | Bloebaum et al. | |
| 6,218,953 B1 | 4/2001 | Petite | |
| 6,232,885 B1 | 5/2001 | Ridenour et al. | |
| 6,233,327 B1 | 5/2001 | Petite | |
| 6,246,677 B1 | 6/2001 | Nap et al. | |
| 6,249,516 B1 | 6/2001 | Brownrigg et al. | |
| 6,263,009 B1 | 7/2001 | Ramberg et al. | |
| 6,321,271 B1 | 11/2001 | Kodialam et al. | |
| 6,335,953 B1 | 1/2002 | Sanderford, Jr. et al. | |
| 6,349,094 B1 | 2/2002 | Vastano et al. | |
| 6,363,057 B1 | 3/2002 | Ardalan et al. | |
| 6,369,769 B1 | 4/2002 | Nap et al. | |
| 6,377,609 B1 | 4/2002 | Brennan, Jr. | |
| 6,396,839 B1 | 5/2002 | Ardalan et al. | |
| 6,424,270 B1 | 7/2002 | Ali | |
| 6,426,027 B1 | 7/2002 | Scarborough, III et al. | |
| 6,430,268 B1 | 8/2002 | Petite | |
| 6,437,692 B1 | 8/2002 | Petite et al. | |
| 6,452,986 B1 | 9/2002 | Luxford et al. | |
| 6,456,644 B1 | 9/2002 | Ramberg et al. | |
| 6,538,577 B1 | 3/2003 | Ehrke et al. | |
| 6,604,434 B1 | 8/2003 | Hamilton et al. | |
| 6,612,188 B2 | 9/2003 | Hamilton | |
| 6,617,879 B1 | 9/2003 | Chung | |
| 6,617,976 B2 | 9/2003 | Walden et al. | |
| 6,617,978 B2 | 9/2003 | Ridenour et al. | |
| 6,618,578 B1 | 9/2003 | Petite | |
| 6,626,048 B1 | 9/2003 | Dam Es et al. | |
| 6,628,764 B1 | 9/2003 | Petite | |
| 6,639,939 B1 | 10/2003 | Naden et al. | |
| 6,650,249 B2 | 11/2003 | Meyer et al. | |
| 6,657,552 B2 | 12/2003 | Belski et al. | |
| 6,671,586 B2 | 12/2003 | Davis et al. | |
| 6,700,902 B1 | 3/2004 | Meyer | |
| 6,704,301 B2 | 3/2004 | Chari et al. | |
| 6,734,663 B2 | 5/2004 | Fye et al. | |
| 6,735,178 B1 | 5/2004 | Srivastava et al. | |
| 6,747,557 B1 | 6/2004 | Petite et al. | |
| 6,747,981 B2 | 6/2004 | Ardalan et al. | |
| 6,763,013 B2 | 7/2004 | Kennedy | |
| 6,778,099 B1 | 8/2004 | Meyer et al. | |
| 6,784,806 B1 | 8/2004 | Lee et al. | |
| 6,784,807 B2 | 8/2004 | Petite et al. | |
| 6,816,538 B2 | 11/2004 | Shuey et al. | |
| 6,836,108 B1 | 12/2004 | Balko et al. | |
| 6,836,737 B2 | 12/2004 | Petite et al. | |
| 6,842,460 B1 | 1/2005 | Olkkonen et al. | |
| 6,850,197 B2 | 2/2005 | Paun | |
| 6,859,186 B2 | 2/2005 | Lizalek et al. | |
| 6,862,498 B2 | 3/2005 | David et al. | |
| 6,867,707 B1 | 3/2005 | Kelley et al. | |
| 6,885,309 B1 | 4/2005 | Van Heteren | |
| 6,891,838 B1 | 5/2005 | Petite et al. | |
| 6,894,975 B1 | 5/2005 | Partyka | |
| 6,900,737 B1 | 5/2005 | Ardalan et al. | |
| 6,914,533 B2 | 7/2005 | Petite | |
| 6,914,893 B2 | 7/2005 | Petite | |
| 6,918,311 B2 | 7/2005 | Nathan | |
| 6,931,445 B2 | 8/2005 | Davis | |
| 6,940,396 B2 | 9/2005 | Hammond et al. | |
| 6,965,575 B2 | 11/2005 | Srikrishna et al. | |
| 6,972,555 B2 | 12/2005 | Balko et al. | |
| 6,982,651 B2 | 1/2006 | Fischer | |
| 7,012,546 B1 | 3/2006 | Zigdon et al. | |
| 7,020,701 B1 | 3/2006 | Gelvin et al. | |
| 7,031,945 B1 | 4/2006 | Donner | |
| 7,046,682 B2 | 5/2006 | Carpenter et al. | |
| 7,054,271 B2 | 5/2006 | Brownrigg et al. | |
| 7,062,227 B2 | 6/2006 | Chevalier et al. | |
| 7,065,045 B2 | 6/2006 | Jeffries et al. | |
| 7,103,511 B2 | 9/2006 | Petite | |
| 7,126,494 B2 | 10/2006 | Ardalan et al. | |
| 7,142,123 B1 | 11/2006 | Kates | |
| 7,234,000 B2 * | 6/2007 | McEachern et al. | 709/235 |
| 7,498,953 B2 | 3/2009 | Salser et al. | |
| 7,583,202 B2 | 9/2009 | Robinson et al. | |
| 7,653,394 B2 | 1/2010 | McMillin | |
| 7,676,195 B2 | 3/2010 | Ratiu et al. | |
| 7,802,015 B2 | 9/2010 | Cheifot et al. | |
| 7,840,178 B2 * | 11/2010 | Hellman | 455/3.02 |
| 7,843,834 B2 | 11/2010 | Picard | |
| 2001/0046225 A1 | 11/2001 | Schwaller et al. | |
| 2002/0010641 A1 * | 1/2002 | Stevens et al. | 705/26 |
| 2002/0019725 A1 | 2/2002 | Petite | |
| 2002/0037716 A1 | 3/2002 | McKenna et al. | |
| 2002/0146985 A1 | 10/2002 | Naden | |
| 2002/0159385 A1 * | 10/2002 | Susnow et al. | 370/229 |
| 2002/0169643 A1 | 11/2002 | Petite et al. | |
| 2002/0186749 A1 | 12/2002 | Jones | |
| 2003/0033394 A1 | 2/2003 | Stine | |
| 2003/0037167 A1 | 2/2003 | Garcia-Luna-Aceves et al. | |
| 2003/0048199 A1 | 3/2003 | Zigdon et al. | |
| 2003/0063723 A1 | 4/2003 | Booth et al. | |
| 2003/0078029 A1 | 4/2003 | Petite | |
| 2003/0093484 A1 | 5/2003 | Petite | |
| 2003/0103486 A1 | 6/2003 | Salt et al. | |
| 2003/0179149 A1 | 9/2003 | Savage et al. | |
| 2004/0004555 A1 | 1/2004 | Martin | |
| 2004/0008663 A1 | 1/2004 | Srikrishna et al. | |
| 2004/0040368 A1 | 3/2004 | Guckenberger et al. | |
| 2004/0053639 A1 | 3/2004 | Petite et al. | |

(56) References Cited

U.S. PATENT DOCUMENTS

| | | |
|---|---|---|
| 2004/0061623 A1 | 4/2004 | Tootoonian Mashhad et al. |
| 2004/0062224 A1 | 4/2004 | Brownrigg et al. |
| 2004/0085928 A1 | 5/2004 | Chari et al. |
| 2004/0088083 A1 | 5/2004 | Davis et al. |
| 2004/0131125 A1 | 7/2004 | Sanderford, Jr. et al. |
| 2004/0170217 A1 | 9/2004 | Ho |
| 2004/0183687 A1 | 9/2004 | Petite et al. |
| 2004/0192415 A1 | 9/2004 | Luglio et al. |
| 2004/0193998 A1* | 9/2004 | Blackburn et al. ............ 714/763 |
| 2004/0215412 A1 | 10/2004 | Yoshida et al. |
| 2004/0218616 A1 | 11/2004 | Ardalan et al. |
| 2004/0246907 A1 | 12/2004 | Hoffmann |
| 2004/0252701 A1* | 12/2004 | Anandakumar et al. . 370/395.21 |
| 2004/0264379 A1 | 12/2004 | Srikrishna et al. |
| 2004/0264435 A1 | 12/2004 | Chari et al. |
| 2005/0018751 A1 | 1/2005 | Roy et al. |
| 2005/0024235 A1 | 2/2005 | Shuey et al. |
| 2005/0030199 A1 | 2/2005 | Petite et al. |
| 2005/0036487 A1 | 2/2005 | Srikrishna |
| 2005/0043059 A1 | 2/2005 | Petite et al. |
| 2005/0043860 A1 | 2/2005 | Petite |
| 2005/0052290 A1 | 3/2005 | Naden et al. |
| 2005/0052328 A1 | 3/2005 | De Angelis |
| 2005/0053047 A1 | 3/2005 | Osterloh et al. |
| 2005/0068970 A1 | 3/2005 | Srikrishna et al. |
| 2005/0074015 A1 | 4/2005 | Chari et al. |
| 2005/0105524 A1 | 5/2005 | Stevens et al. |
| 2005/0129005 A1 | 6/2005 | Srikrishna et al. |
| 2005/0147097 A1 | 7/2005 | Chari et al. |
| 2005/0163144 A1 | 7/2005 | Srikrishna et al. |
| 2005/0169020 A1 | 8/2005 | Knill |
| 2005/0171696 A1 | 8/2005 | Naden et al. |
| 2005/0172024 A1 | 8/2005 | Cheifot et al. |
| 2005/0190055 A1 | 9/2005 | Petite |
| 2005/0195768 A1 | 9/2005 | Petite et al. |
| 2005/0195775 A1 | 9/2005 | Petite et al. |
| 2005/0201397 A1 | 9/2005 | Petite |
| 2005/0218873 A1 | 10/2005 | Shuey et al. |
| 2005/0226179 A1 | 10/2005 | Behroozi |
| 2005/0227615 A1 | 10/2005 | Sakoda |
| 2005/0243867 A1 | 11/2005 | Petite |
| 2005/0251401 A1 | 11/2005 | Shuey |
| 2005/0251403 A1 | 11/2005 | Shuey |
| 2005/0270173 A1 | 12/2005 | Boaz |
| 2005/0271006 A1 | 12/2005 | Chari et al. |
| 2005/0278440 A1 | 12/2005 | Scoggins |
| 2006/0002350 A1 | 1/2006 | Behroozi |
| 2006/0007863 A1 | 1/2006 | Naghian |
| 2006/0012935 A1 | 1/2006 | Murphy |
| 2006/0018303 A1 | 1/2006 | Sugiarto et al. |
| 2006/0038548 A1 | 2/2006 | Shuey |
| 2006/0039280 A1* | 2/2006 | Anandakumar et al. ...... 370/229 |
| 2006/0043961 A1 | 3/2006 | Loy |
| 2006/0071810 A1 | 4/2006 | Scoggins et al. |
| 2006/0071812 A1 | 4/2006 | Mason, Jr. et al. |
| 2006/0195610 A1 | 8/2006 | Cole et al. |
| 2006/0203105 A1 | 9/2006 | Srinivasan |
| 2006/0205358 A1 | 9/2006 | Itoh et al. |
| 2006/0217936 A1 | 9/2006 | Mason et al. |
| 2006/0246913 A1 | 11/2006 | Merboth et al. |
| 2006/0253700 A1 | 11/2006 | Della-Libera et al. |
| 2007/0028122 A1 | 2/2007 | Chuang |
| 2007/0050523 A1 | 3/2007 | Emeott et al. |
| 2007/0067121 A1 | 3/2007 | Przydatek et al. |
| 2007/0073866 A1 | 3/2007 | Rudran et al. |
| 2007/0076649 A1 | 4/2007 | Lin et al. |
| 2007/0121521 A1* | 5/2007 | D'Amico et al. ............ 370/252 |
| 2007/0176789 A1 | 8/2007 | Kim |
| 2007/0229256 A1 | 10/2007 | Seal et al. |
| 2007/0236362 A1 | 10/2007 | Brian et al. |
| 2008/0068212 A1 | 3/2008 | Tay et al. |
| 2008/0095075 A1 | 4/2008 | Monier |
| 2008/0250154 A1* | 10/2008 | Sun et al. ...................... 709/232 |
| 2009/0016293 A1 | 1/2009 | Kang et al. |
| 2009/0146839 A1 | 6/2009 | Reddy et al. |
| 2010/0164719 A1 | 7/2010 | George et al. |

FOREIGN PATENT DOCUMENTS

| | | |
|---|---|---|
| WO | WO 2006/083696 A2 | 8/2006 |
| WO | WO 2006/096854 A2 | 9/2006 |

OTHER PUBLICATIONS

A. Ebenezer Jeyakumar et al., "Genetic Algorithm for Optimal Design of Delay Bounded WDM Multicast Networks", Government College of Technology (no date available).

Tanenbaum, A.S., "Computer Networks, Shortest Path Routing, Multipath Routing" Section 5.2 (Routing Algorithms), pp. 289-307, Jan. 1, 1988, *Computer Networks*, Prentice Hall, Englewood Cliffs, NJ.

Hui Zang et al., "Dynamic Lightpath Establishment in Wavelength-Routed WDM Networks", *IEEE Communications*, Sep. 2001.

Younis, M. et al., "Energy-Aware Routing in Cluster-Based Sensor Networks", Oct. 11, 2002, Proceedings of the 10th IEEE International Symposium on Modeling, Analysis & Simulation of Computer & Telecommunications Systems (MASCOTS'02), Piscataway, New Jersey.

Mario Catalani, "Polymatrix and Generalized Polynacci Numbers", Department of Economics, University of Torino, Torino, Italy, Oct. 14, 2002.

Ulaş C. Kozat et al, "Network Layer Support for Service Discovery in Mobile Ad Hoc Networks", INFOCOM 2003, Twenty-Second Annual Joint Conference of the IEE Computer and Communications, IEEE Societies, Mar. 30-Apr. 3, 2003.

Marco Conti et al., "MobileMAN Architecture, Protocols and Services", Mobile Metropolitan Ad hoc Networks, Sep. 2003.

Yu, Gwo-Jong et al., "A Minimum Delay Routing Protocol for Bluetooth Radio Networks", presented at the Aletheia International Symposium of Mathematical Sciences, Aletheia University, Taiwan, pp. 291-314, Tamsui Oxford Journal of Mathematical Sciences, vol. 20, No. 2, 2004.

"Technical Overview of Time Synchronized Mesh Protocol (TSMP)", Dust Networks, Document No. 025-0003-01, Jun. 20, 2006.

International Search Report and Written Opinion of the ISA for PCT International Application No. PCT/US07/20022 issued Jun. 26, 2008.

European Search Report for European Application No. EP 09 15 6694 dated Apr. 22, 2010.

Extended European Search Report dated Sep. 7, 2010 for EP Application No. 09156691.9 (search completed Aug. 24, 2010).

Chia-Bin Jerry Hsiung, "Optimal Topology Discovery for Automatic Meter Reading Using Power Line Carrier", University of Auckland, Auckland, New Zealand (date of publication unavailable).

Sudha Krishnamurthy et al., "RESTORE: A Real-Time Event Correlation and Storage Service for Sensor Networks" (date of publication unavailable).

Jan. 13, 2014 Office Action issued for U.S. Appl. No. 13/780,001.

Feb. 18, 2014 Office Action issued in EP Patent Application No. 09 156 691.9.

Apr. 30, 2014 Office Action issued in U.S. Appl. No. 13/295,435.

* cited by examiner

| Message packets | Redundancy packets | Optional redundancy packets | Optional redundancy packets |
|---|---|---|---|
| | Always sent | Only sent for difficult situations | Only sent for very difficult situations |

FIG. 11

Code word (n = k + r1 + r2 + r3)

| Parameters | |
|---|---|
| Total firmware download size (KiB) | 128 |
| Packet size (B) | 128 |
| Total number of message packets in a firmware download | 1024 |
| Cell size (number of endpoints) | 1000 |
| RS message size for multi-step (k) | 200 |
| Reed Solomon block size (n) | 255 |

FIG. 15

| Broadcast Success Rate (BSR) (%) | 99.999% | 99.990% | 99.900% | 99.000% | 95.000% |
|---|---|---|---|---|---|
| Redundancy Overhead (%) | 1.0% | 1.0% | 2.0% | 5.0% | 15.0% |
| | | | | | |
| Results if no FEC is applied | | | | | |
| Probability for a firmware download to be received by all endpoints | 0.004% | 0.000% | 0.000% | 0.000% | 0.000% |
| Percentage of endpoints without missing packets | 98.981% | 90.266% | 35.897% | 0.003% | 0.000% |
| Average number of retransmitted broadcasts for the cell (%) | 1.00% | 9.52% | 63.23% | 100.00% | 100.00% |
| | | | | | |
| Results if FEC is used | | | | | |
| Probability for a firmware download to be received by all endpoints | 100.000% | 99.993% | 99.884% | 99.042% | 99.907% |
| Percentage of endpoints without missing packets | 100.000% | 100.000% | 100.000% | 99.999% | 100.000% |

FIG. 16

| Number of sent redundancy packets | 10 | 10+20 | 10+20+25 |
|---|---|---|---|
| Redundancy Overhead (%) | 4.8% | 13.0% | 21.6% |
| Probability for a firmware download to be received by all EPs | 94.698% | 100.000% | 100.000% |
| Percentage of endpoints without missing packets | 99.995% | 100.000% | 100.000% |

BSR=99%

FIG. 17

| Number of sent redundancy packets | 10 | 10+20 | 10+20+25 |
|---|---|---|---|
| Redundancy Overhead (%) | 4.8% | 13.0% | 21.6% |
| Probability for a firmware download to be received by all EPs | 0.000% | 99.697% | 100.000% |
| Percentage of endpoints without missing packets | 3.771% | 100.000% | 100.000% |

BSR=95%

FIG. 18

| Number of sent redundancy packets | 10 | 10+20 | 10+20+25 |
|---|---|---|---|
| Redundancy Overhead (%) | 4.8% | 13.0% | 21.6% |
| Probability for a firmware download to be received by all EPs | 0.000% | 0.000% | 99.992% |
| Percentage of endpoints without missing packets | 0.000% | 75.708% | 100.000% |

BSR=90%

FIG. 19

FIRMWARE DOWNLOAD WITH ADAPTIVE LOST PACKET RECOVERY

PRIORITY CLAIM

This application is a continuation-in-part of pending U.S. patent application Ser. No. 13/780,001 filed Feb. 28, 2013, which is a continuation of U.S. patent application Ser. No. 12/902,853 filed Oct. 12, 2010, issued Mar. 5, 2013 as U.S. Pat. No. 8,391,177 entitled "USE OF MINIMAL PROPAGATION DELAY PATH TO OPTIMIZE A MESH NETWORK", which is a continuation of U.S. patent application Ser. No. 11/900,202 filed Sep. 10, 2007, issued Nov. 30, 2010 as U.S. Pat. No. 7,843,834 and bearing the same title, which claims the benefit of two previously filed U.S. Provisional patent applications entitled "METERING RF LAN PROTOCOL AND CELL/NODE UTILIZATION AND MANAGEMENT," respectively assigned U.S. Ser. No. 60/845,056, as filed Sep. 15, 2006, and assigned U.S. Ser. No. 60/845,994, as filed Sep. 20, 2006, all of which are hereby incorporated herein by reference in their entireties for all purposes. Any disclaimer that may have occurred during prosecution of the above-referenced applications is hereby expressly rescinded.

FIELD OF THE SUBJECT MATTER

The presently disclosed subject matter relates to a wireless mesh network technology, and in particular to such networks including firmware image update functionality for network nodes.

BACKGROUND OF THE SUBJECT MATTER

Wireless mesh networks have been employed to good advantage in various environments and often are used to collect and report usage (consumption) and/or generation information for various utilities including, for example, water, gas, and electricity usage. Such mesh networks may incorporate a number of devices (nodes) that operate based on firmware stored within the device (node). In some instances it is desirable from time to time to update such stored firmware for varying purposes including such as adding additional functionality for the node, correcting (patching) errors in existing firmware, or for other reasons.

Generally, firmware (software) updates are accomplished by broadcasting firmware packets to the nodes. Broadcast packets are not acknowledged and often the fact that such broadcasts are conducted in a noisy RF environment means that all packets will not be received by all nodes. Furthermore the broadcast efficiency depends on the environment and is not easy to predict. In addition the ever changing nature of interference levels and network traffic load will make the broadcast efficiency vary with time.

In previously known arrangements, following the broadcast of a number of packets corresponding to, for example, a new or replacement firmware image, the network head (management system) will interrogate the various network nodes to find out which packets are missing in each node. The missing packets are then retransmitted either through a broadcast mechanism or through individual point-to-point communications. As different nodes are usually missing different packets, this process may entail the retransmission of a very large number of packets, slowing down the whole process.

In some systems, redundant broadcasts including systematic repetition of each packet is employed to attempt to mitigate problems associated with broadcast update techniques. Such redundancy increases the probability of reception of the packets but slows down the whole process.

In view of these identified issues, it would be advantageous to provide a firmware (software) updating (downloading) arrangement that provides improved packet reception reliability and recovery.

While various implementations of firmware updating systems have been developed, and while various combinations of error correcting techniques have been developed, no design has emerged that generally encompasses all of the desired characteristics as hereafter presented in accordance with the subject technology.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Repeat use of reference characters throughout the present specification and appended drawings is intended to represent same or analogous features, elements, or steps.

DETAILED DESCRIPTION OF THE SUBJECT MATTER

Figure 1:
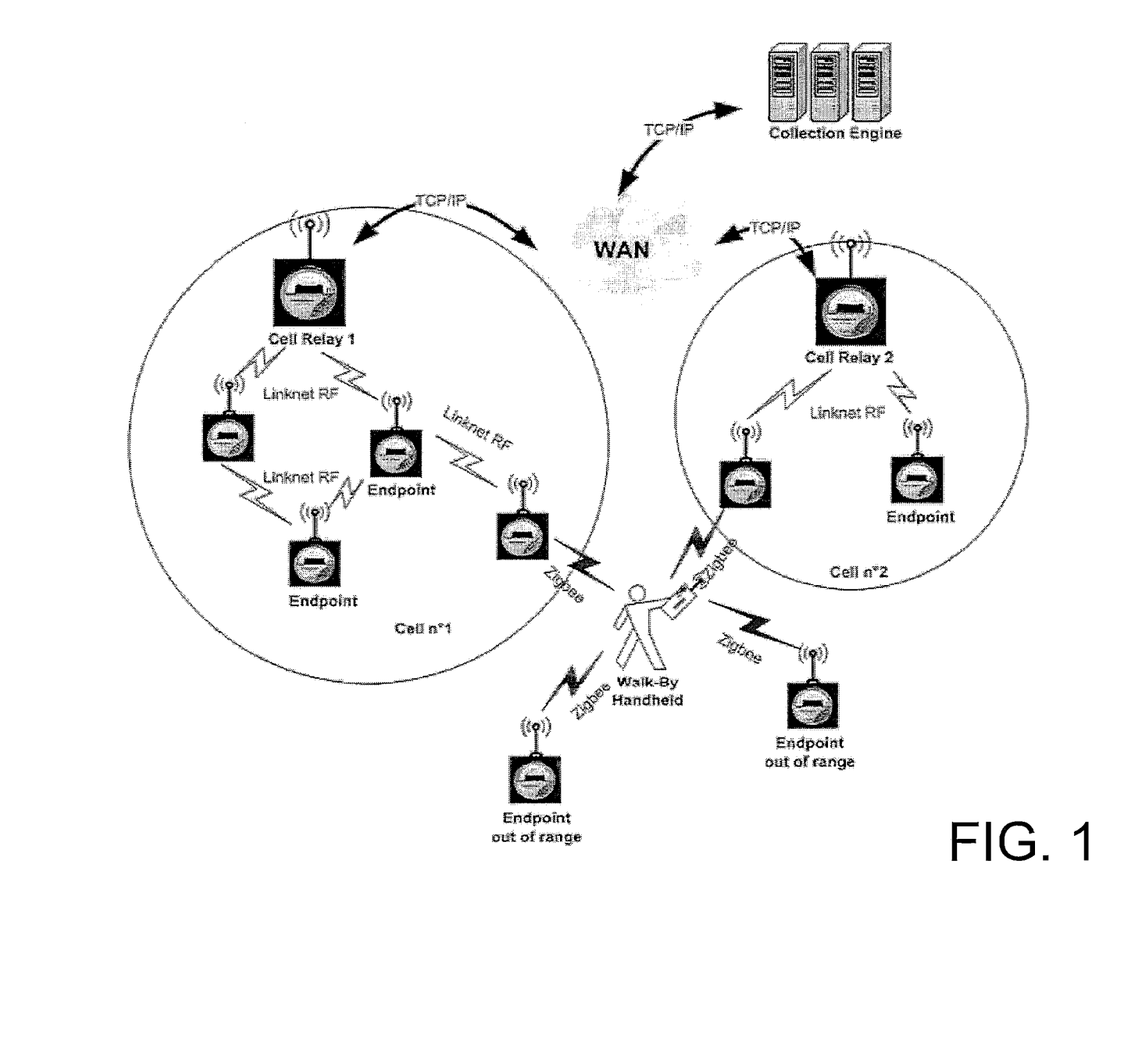
FIG. 1 depicts representative network architecture in accordance with the presently disclosed subject matter.

Mesh networks and their associated protocol architecture may be described as based on a tree with four kinds of elements, spread on cells, generally represented by present FIG. 1. At the top of such architecture is a Collection Engine, which acts as a central database. It knows all the cells and their contents, that is, the cell where each meter (endpoint or node) is as well as its address. The Collection Engine collects monthly (or other appropriate interval) data from every endpoint and it allows access to any meter in the network. The user can request or send data to a single meter or broadcast information. The Collection Engine can communicate with the router of the selected cell by TCP/IP protocol inside Internet network.

In such tree hierarchy, just below the Collection Engine stand routers of the cells, referred to as the Cell Relays. There is one Cell Relay for each cell and it is the gateway between individual meters in the cell and the Collection Engine. The Cell Relay contains a routing table of all the meters in its cell. It can also forward data in the two directions, that is, between the Collection Engine and the endpoints. It also assumes the role of synchronizing the cell.

At the bottom of such tree are located so-called Endpoints (EPs). They can transmit and receive metering information. In addition, each one of them can act as a relay for distant endpoints with no additional hardware.

The last indicated module of such four kinds of elements is the Walk-By unit, a Zigbee (or other communications technology) handheld that can communicate with orphan endpoints or configure protocol parameters for endpoints. Therefore, an exemplary network preferably uses three media, which are an RF link, a Zigbee RF Link, and a TCP/IP link, all as represented per present FIG. 1.

Figure 2:
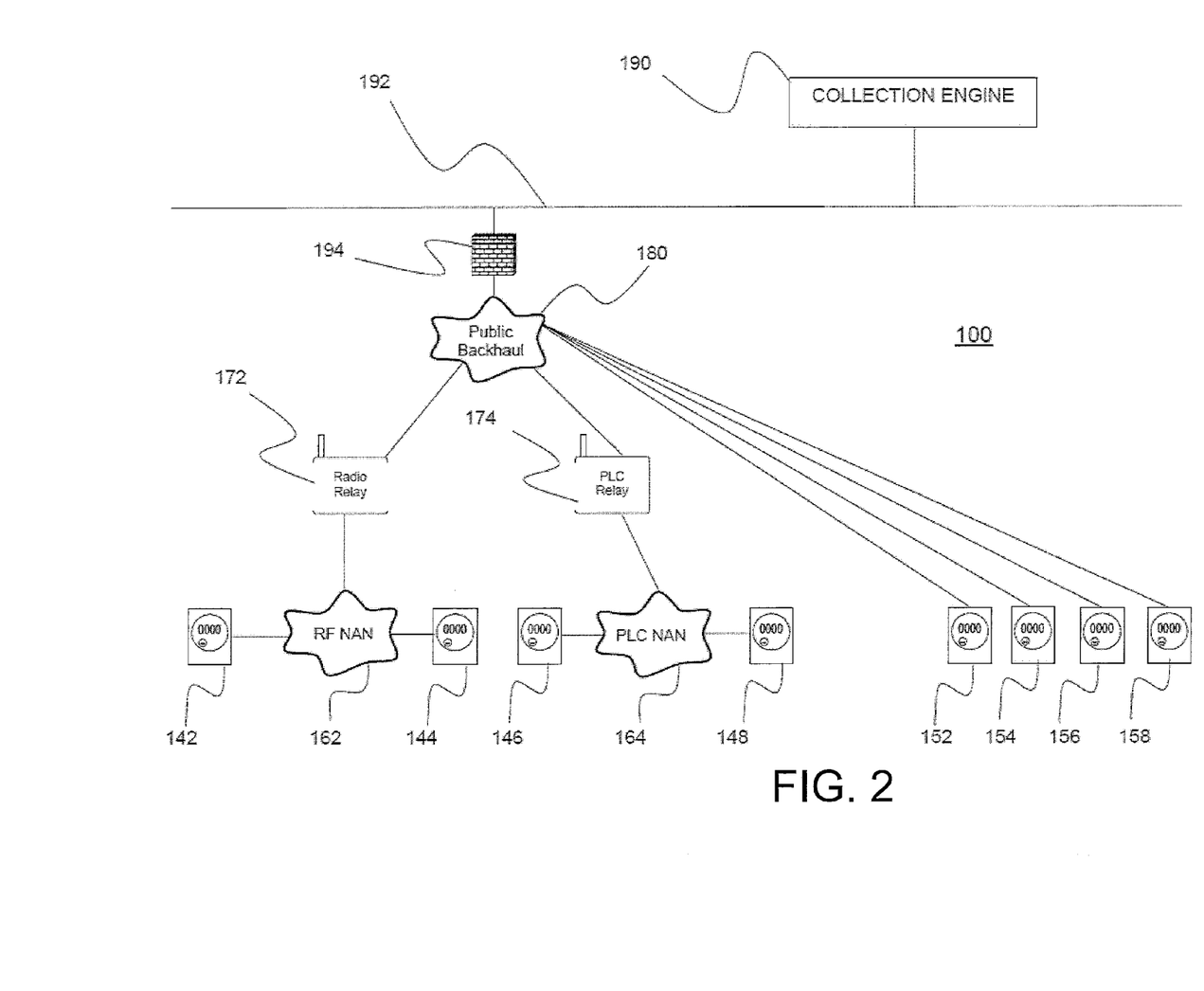
FIG. 2 is a block diagram overview illustration of an Advanced Metering System (AMS) and a representation of corresponding methodology thereof, in accordance with the presently disclosed subject matter.

FIG. 2 is a block diagram overview illustration of an Advanced Metering System (AMS) in accordance with the presently disclosed subject matter. Advanced Metering System (AMS) generally 100 in accordance with the presently disclosed subject matter is designed to be a comprehensive system for providing advanced metering information and applications to utilities. AMS 100 in pertinent part is designed and built around industry standard protocols and transports, and therefore is intended to work with standards compliant components from third parties.

Major components of AMS 100 include exemplary respective meters (endpoints) 142, 144, 146, 148, 152, 154, 156, and 158; one or more respective radio-based networks including RF neighborhood area network (RF NAN) 162 and its accompanying Radio Relay 172, and power line communications neighborhood area network (PLC NAN) 164 and its accompanying PLC Relay 174; an IP (internet protocol) based Public Backhaul 180; and a Collection Engine 190. Other components within exemplary AMS 100 may include a utility LAN (local area network) 192 and firewall 194 through which communications signals to and from Collection Engine 190 may be transported from and to respective exemplary meters 142, 144, 146, 148, 152, 154, 156, and 158 or other devices including, but not limited to, Radio Relay 172 and PLC Relay 174.

AMS 100 is configured to be transparent in a transportation context, such that exemplary respective meters 142, 144, 146, 148, 152, 154, 156, and 158 may be interrogated using Collection Engine 190 regardless of what network infrastructure exists in-between or among such components. Moreover, due to such transparency, the meters may also respond to Collection Engine 190 in the same manner.

As represented by the illustration in FIG. 2, Collection Engine 190 is capable of integrating Radio, PLC, and IP connected meters. To facilitate such transparency, AMS 100 operates and/or interfaces with ANSI standard C12.22 meter communication protocol for networks. C12.22 is a network transparent protocol, which allows communications across disparate and asymmetrical network substrates. C12.22 details all aspects of communications, allowing C12.22 compliant meters produced by third parties to be integrated into a single advanced metering interface (AMI) solution, AMS 100 is configured to provide meter reading as well as load control/demand response, in home messaging, and outage and restoration capabilities. All data flowing across the system is sent in the form of C12.19 tables. The system provides full two-way messaging to every device; however, many of its functions may be provided through broadcast or multicast messaging and session-less communications.

Figure 3:
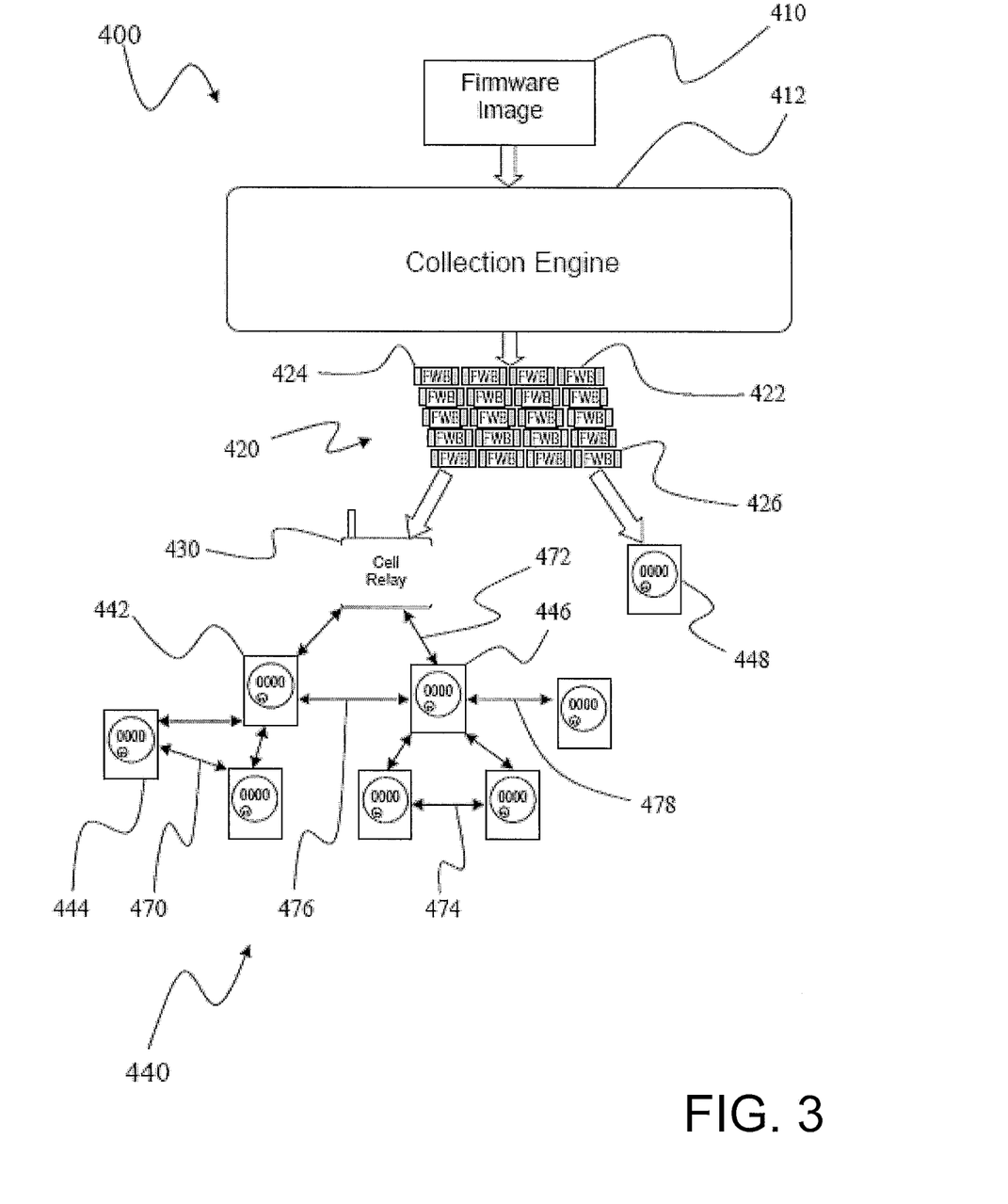
FIG. 3 schematically illustrates an exemplary methodology and corresponding apparatus for transmitting firmware to end devices in accordance with the presently disclosed subject matter.

FIG. 3 schematically illustrates an exemplary configuration (representing both methodology and apparatus) for implementing one or more firmware downloads in accordance with the present technology. While for exemplary purposes, most of the discussion herewith refers to such firmware downloads as new or upgraded firmware, it is to be understood that the presently disclosed subject matter is equally applicable to, and fully encompasses, any firmware downloads, regardless of their characterization. For example, it might be due to particular circumstances and/or needs for which the firmware is to be downloaded or to a particular device that is to be returned to a previous version of firmware for such device. As another example, it might be that the firmware download for a particular device is regarded as being the same version of firmware, or a corrected version thereof, presently resident and operating with such device, as a technique for in effect rebooting the device, or otherwise correcting some corrupted subject matter. All of such variations in the actual constitution and characterization of the nature and/or reasons for the subject downloads, are intended to come within in the spirit and scope of the presently disclosed subject matter.

Generally when new or upgraded firmware is to be installed within a system 400, an image 410 of the firmware to be downloaded will be provided to an Advanced Metering System (AMS) Collection Engine 412 as a binary image file. Further discussion of Collection Engine 412 is included herewith but for the present it is noted that Collection Engine 412 is responsible for breaking up the single binary image into a series 420 of discrete blocks 422 that can be distributed across a communications arrangement such as an RF LAN, or other media. In an exemplary embodiment, an ANSI C12.22 compliant media may be used. Such blocks 422 have previously contained information to verify the block's integrity, as well as a block identifier, which is represented in FIG. 3 by the leading and trailing spaces 424 and 426, respectively.

In general, when transferring blocks, each broken down, discrete block 422 is in its entirety preferably written into a record in a manufacturer's table for firmware images. End devices 440 are configured to evaluate such blocks 422 to determine their discrete integrity by using their block level hashes. The end devices can also validate that such blocks 422 are assembled (that is, reassembled) into the correct order. Finally, each end device is able to evaluate the integrity of the overall image by evaluating the CRC (Cyclic Redundancy Check) or hash for the entire image.

Prior basic process for transferring firmware image blocks 422 involved in part functionality that is similar to that used for reading data from meters. A broadcast containing the image blocks 422 was sent to meters 440. Meters 440 indicated whether they had successfully received the image blocks 422. Meters that don't respond are retried in a recovery process to make up for any failures. Because of the critical nature of firmware images, and the large number of blocks involved, some additional control and feedback mechanisms may be desired in some instances, to logistically handle the volume of traffic.

Managing the transport of firmware blocks 422 in an environment which encounters or involves unreliable media becomes critical when transferring firmware images. When transferring blocks across an RF LAN, for example, it is relatively likely that at least one node within a given cell will fail to successfully receive a block. Such circumstances have been addressed in two manners. First, it was important that blocks be able to be transmitted and received in any order. Second, depending on the practical reliability of the underlying network, it may have been practiced to broadcast a given block several times before resorting to point-to-point transfers of image blocks.

With further reference to FIG. 3, a firmware download process begins with the Collection Engine 412 sending out a broadcast message to all target nodes, calling a manufacturer's stored procedure or writing to a manufacturer's table in the device. In such context, a target node may correspond to an end device such as meter 448, cell relay 430, or meters 440 including representative meters 442, 444, and 446. Such command indicates to the device the number of firmware blocks it should expect to receive, and that it should now be in firmware download mode.

When in such firmware download mode, the device will report the number of blocks it has successfully received as part of any daily read requests. Additionally, being placed in firmware download mode resets to zero a block counter of such device. Moreover, the command includes instructions to the end devices indicating that no direct acknowledgements on the part of the meters should be made. Rather, devices acknowledge such command by reporting their success count as part of the next interrogation cycle.

Collection Engine 412 is responsible for evaluating, based on the presence of the firmware block success count, whether all of the targeted nodes have successfully entered firmware download mode. Nodes that have not switched to firmware download mode eventually are then individually contacted by the Collection Engine 412.

Once the target nodes are in firmware download mode, Collection Engine 412 will begin broadcasting firmware blocks 422 to the target nodes 440. As an alternative to transmission of the firmware blocks 422 exclusively by Collection Engine 412, it may be desirable to transfer the firmware image 410 to the cell relays 430 and then send a command to instruct them to broadcast the firmware image 410 within their respective cell. Such alternative method would be one approach to reducing public carrier back-haul costs and to allowing cell relays to better manage bandwidth within their cells.

Completion of the broadcast transfers is a process that may take several days, or even weeks, depending on whether it is being done in conjunction with other operations. In any event, after such completion, Collection Engine 412 begins evaluating the block success count of each of the target nodes. When a node has a complete set of blocks, it will record a special event in the meter history log indicating such successful completion. Most nodes should have a complete set of blocks once the broadcast transfers are complete. Nodes that are still missing blocks will need to have them transferred point-to-point. Nodes that have excessive missing blocks after the broadcast process is complete may be flagged for possible maintenance or replacement as being potentially defective.

To facilitate point-to-point transfers, Collection Engine 412 will call a second stored procedure in the device. Such second procedure, a manufacturer's stored procedure, will provide a list of missing blocks, by block number. In an exemplary embodiment, the block list will include a predetermined maximum number of blocks, and a status byte indicating whether there is more than the predetermined number of blocks missing. For example, the predetermined maximum number of blocks may be set to twenty blocks. In using such exemplary method, most meters will receive all blocks and will not need to report on individual blocks; however, those meters that are missing blocks can be interrogated for a manifest of what they still require.

Collection Engine 412 will use such missing block data provided by the respective meter 440 to perform point-to-point block transfers. Meter nodes that cannot be contacted will be reported to the system operator. Once the point-to-point retries have been completed, the devices can be instructed to enable the new firmware. The command to activate the firmware may correspond to a C12.22 manufacturer's stored procedure. If a date and time is specified, the device will activate the firmware at the specified date and time. If no date and time is provided, the device normally will be set to activate the firmware download on an immediate basis.

Successful firmware activation can involve two additional aspects. First, selected metrology devices, i.e., meters, may employ not just one, but a plurality of images related to different aspects of the device's operation. In an exemplary configuration, at least three separate firmware images may be employed: one for the meter register board, another for a neighborhood local area network (LAN) microprocessor, and a third for a home area network (HAN) processor. In a more specific exemplary configuration, the neighborhood local area network microprocessor may correspond to an RF LAN microprocessor while the home area network processor may correspond to a Zigbee processor. Each of such components will have its own firmware image that may need to be updated. Additionally, over the course of time, new metrology device versions which require different firmware may be incorporated into existing systems. In such case, a given cell may have a mixture of devices with different firmware needs. For example, the Zigbee protocol may be used for communicating with gas meters, in-home displays, load-control relays, and home thermostats.

Figure 4:
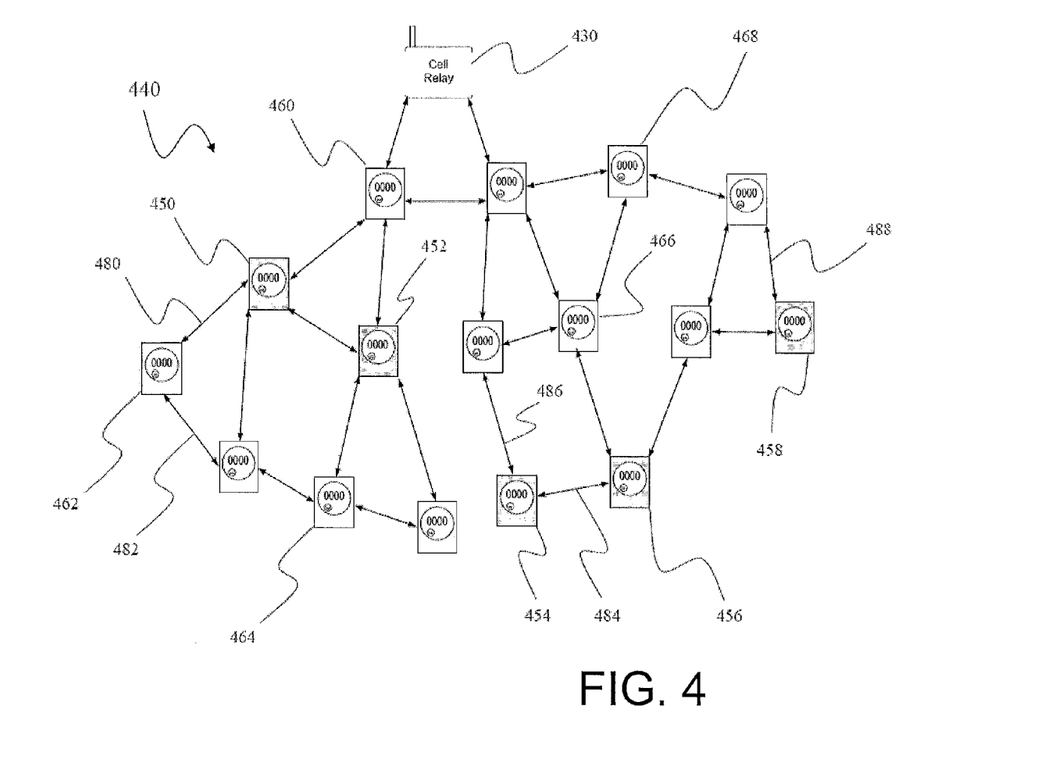
FIG. 4 schematically illustrates an exemplary methodology and corresponding apparatus for transmitting differing firmware images to selected end devices.

With reference presently to FIG. 4, there is illustrated and represented a known exemplary methodology for transmitting differing firmware images to selected end devices.

As illustrated in FIG. 4, for the general group of meters 440 illustrated, a first subset of such meters illustrated with a white background (and generally represented by meters 460, 462, 464, 466, and 468) support one firmware image, while a second subset of generally illustrated meters 440 illustrated with a grey background (and generally represented by meters 450, 452, 454, 456, and 458) support another firmware image. As a result, while meters 462, 464 are under meters 450, 452 in the cell network hierarchy (or tree) and may be able to exchange firmware images with each other, the only way meters 462, 464 can receive their firmware is through meters 450, 452, which in the present example are of another device type.

In order to handle such exemplary circumstances as represented in FIG. 4, the firmware image distribution system is independent of the actual device for which the firmware is intended. Put another way, when an image is delivered to cell relay 430 and distributed over the RF LAN, it is distributed to all of the members of the cell that match the broadcast or multicast address used, regardless of whether the image is compatible with their particular hardware. This means that cell members act as hosts for the firmware. In order to update both types of meters two firmware updates will need to be distributed. Firmware will be transferred first to meters of the first subset (generally represented by meters 460, 462, 464, 466, and 468), and then activated. Secondly, firmware will be transferred to meters of the second subset (generally represented by meters 450, 452, 454, 456, and 458), and then activated. Such same mechanism can be used to download separate firmware images for individual microprocessors within the end node, as needed on a case-by-case basis.

With reference again to both FIGS. 3 and 4, it will be observed that the various meters or nodes 440 are illustrated as being connected to one another by double-headed arrow lines (representatively illustrated at 470, 472, 474, 476, and 478 in FIG. 3, and at 480, 482, 484, 486, and 488 in FIG. 4). Such interconnections schematically illustrate a self-generated network formed by the meters 440 themselves per the presently disclosed subject matter, in concert with each other and cell relay 430 as the individual meters 440 are activated. Because each of the respective meters 440 is self-contained with respect to the RF LAN formed, an opportunity exists to distribute upgrade software (firmware) among the various meters on a viral peer-to-peer basis.

In such foregoing viral peer-to-peer model, a firmware image may be delivered to exemplary cell relay 430. From there, Collection Engine 412 preferably may send a stored procedure command to cell relay 430, indicating that it should distribute such firmware image to the RF LAN. Collection Engine 412 also sends a command to the meter nodes within the cell using a broadcast or multicast message, instructing them that a new firmware image is available. Once such command is received, cell relay 430 makes the firmware available to its local RF LAN processor. Per the presently disclosed subject matter, meter nodes 440 within such cell instruct their RF LAN processors to begin looking for blocks. At such point, the RF LAN processors take over the block transfer process.

Such disclosed viral-type distribution mechanism may be very powerful and very efficient in that it may be able to make better use of the available physical bandwidth. Under such viral peer-to-peer arrangement, individual meter nodes 440 can grab firmware images or portions of firmware images, from their immediate neighbors or parents, rather than needing to get the data directly from cell relay 430 or Collection Engine 412. As a result, one portion of the cell could be exchanging firmware blocks while another portion of the cell could be passing various messages between meter nodes 140 and cell relay 130, all without impacting each other.

As previously employed, the Forward Error Correction (FEC) used to recover missing symbols was a Reed-Solomon code RS(n,k) with symbols in Galois Field GF(256). This means that the symbols of the code are bytes and that for each block of k bytes, there are appended r=n−k additional redundancy bytes. Such a code has a Hamming distance of r+1 and allows the computation of r missing symbols per block, provided the positions of the missing symbols are known (this is called an erasure in coding theory). The code parameters are adapted to the network performance but as a first approximation, a Reed-Solomon RS(255,200) can be suggested.

The steps for encoding include: (1) If the message length is shorter than k bytes, zero-pad the message to make it k-byte long. The zeros are on the most significant symbol side of the message. (2) Compute the r redundancy bytes with the RS(n, k) code.

The steps for decoding are: (1) If no packets are missing, no decoding has to be done because the purpose of this decoding is only to recover missing packets. It plays no role for error detection. The decoding program needs to know how many packets are missing and where they are located in the block. (2) If the message is shorter than k bytes (should be known from the length field of the header), use zero-padding to make it k-byte long as for coding process. (3) If some packets are missing, replace the missing symbols by zeros. (4) Compute the missing packets with the RS(n,k) code.

Each byte of the message is considered as an element of Galois Field GF(256). These elements are called symbols. All the operations made with these symbols (addition, subtraction, multiplication and division) should be made according to the additive and multiplicative laws of the Galois field GF(256), constructed with the primitive polynomial $p(x)=x^8 x^7+x+x+x^2+x+1$. A symbol of GF(256) has several useful representations: a binary representation $\{b_7b_6b_5b_4b_3b_2b_1b_0\}$, a polynomial representation $b_7a^7+b_6a^6+b_5a^5+b_4a^4+b_3a^3+b_2a^2+b_1a^1+b_0$ and an exponential representation $\alpha^m$.

In the last two representations, $\alpha$ is a primitive element such that $p(\alpha)=0$. The binary or polynomial representation is useful for addition and the exponential representation is useful for multiplication. All GF(256) elements, except zero, have an exponential representation, the complete field can be written as the set $GF(256)=\{0, 1, \alpha, \alpha^2, \alpha^3, \ldots, \alpha^{253}, \alpha^{254}\}$. The conversion between the two representations is done with a look-up table. For the implementation of the encoder/decoder, it is necessary to add and multiply the symbols in GF(256). Addition is easily done with the binary or polynomial representation of the symbols. The operation is equivalent to a modulo 2 addition of each bit, for instance: 0010 1100+1000 1111=1010 0011

Multiplication is more difficult because a conversion to the exponential form of the symbol is necessary. A look-up table is used for this purpose. As an example, one may multiply the two symbols of the previous example: 0010 1100×1000 1111

The first symbol (44) has the exponential representation $\alpha^{190}$, the second symbol (143) has the exponential representation $\alpha^{90}$. The product is $\alpha^{190}\alpha^{90}=\alpha^{280}=\alpha^{255+25}=\alpha^{25}$ because $\alpha^{255}=1$. One can use the table in the other way to convert the result in binary form and obtain 44*143=226.

Figure 5:
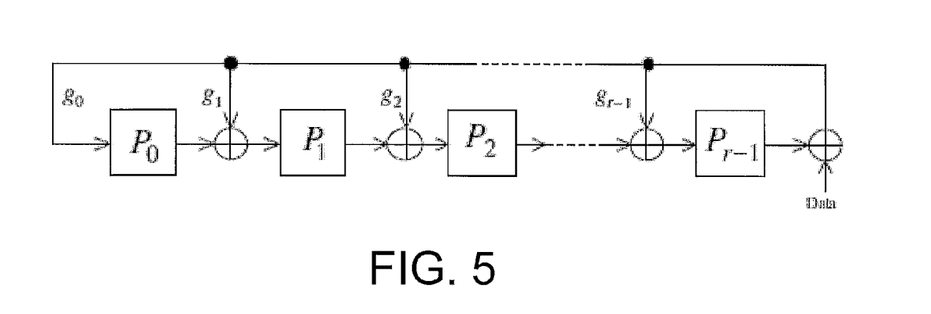
FIG. 5 depicts an exemplary Reed-Solomon encoder configuration as may be employed in implementing the presently disclosed subject matter.

Conforming to established convention in coding theory for a Reed-Solomon encoder, the polynomial representation for the messages is used. The k-symbol data block, $\{u_{k-1}, u_{k-2}, \ldots u_1, u_0\}$, can be written $u(x)+u_{k-1}x^{k-1}+u_{k-2}x^{k-2}+\ldots$ $+u_3x^3+u_2x^2+u_1x^1+u_0$. The symbol $u_{k-1}$ is the first symbol sent. The n-symbol code word (message+redundancy symbols) can be written $c(x)=c_{k-1}x^{k-1}+c_{k-2}x^{k-2}+\ldots+c_3x^3+c_2x^2+c_1x^1+c_0$. The Reed-Solomon encoding process is equivalent to a division of the message by a generator polynomial $G(x)$. Such can be implemented with a linear feedback shift register as shown in FIG. 5. Such is similar to the conventional CRC encoder. The difference is that here each multiplication by a coefficient and each addition has to be understood as multiplication and addition in GF(256).

In the shift register implementation shown in FIG. 5, the i g are elements of GF(256). The shift register is first initialized with zeros. The symbols of the message are then shifted into the register, beginning with $u_{k-1}$ and finishing with $u_0$. After the whole data block has been pushed into the shift register, the content of the register is the remainder of the division. These symbols are the FEC symbols and they are appended to the initial message in the following way:

$$c=\{u_{k-1}, u_{k-2}, \ldots u_1, u_0, P_{r-1}, P_{r-2}, \ldots p_2, p_1, p_0\}$$

As with conventional CRC computing, the multiplicative factors in the shift register are given by the coefficients of a polynomial:

$$G(x)=g_0+g_1x+g_2x^2+g_3x^3+\ldots+x^r$$

For a Reed-Solomon code this polynomial is defined by its roots in the following way:

$$G(x)=(x-\alpha)(x-\alpha^2)(x-\alpha^3)(x-\alpha^4)\ldots(x-\alpha^r)$$

This polynomial needs to be developed to find the $g_i$ coefficients. As an example for a RS(255,200) code the result is:

$$G(x)=\alpha^{10}+\alpha^{123}x+\alpha^{142}x^2+\alpha^{189}x^3+\alpha^{172}x^4+\alpha^{17}x^5+$$
$$\alpha^{120}x^6+\alpha^{40}x^7+\alpha^{185}x^8+\alpha^{235}x^9+\alpha^{90}x^{10}+\alpha^{162}x^{11}+$$
$$\alpha^{76}x^{12}+\alpha^{232}x^{13}+\alpha^{236}x^{14}+\alpha^{83}x^{15}+\alpha^{175}x^{16}+$$
$$\alpha^{171}x^{17}+\alpha^{84}x^{18}+\alpha^{230}x^{19}+\alpha^{167}x^{20}+\alpha^{34}x^{21}+$$
$$\alpha^2x^{22}+\alpha^{77}x^{23}+\alpha^{43}x^{24}+\alpha^{100}x^{25}+\alpha^{201}x^{26}+$$
$$\alpha^{118}x^{27}+\alpha^{90}x^{28}+\alpha^{117}x^{29}+\alpha^{215}x^{30}+\alpha^{102}x^{31}+$$
$$\alpha^{80}x^{32}+\alpha^{204}x^{33}+\alpha^{180}x^{34}+\alpha^2x^{35}+\alpha^9x^{36}+\alpha^{62}x^{37}+$$
$$\alpha^{93}x^{38}+\alpha^{41}x^{39}+\alpha^{148}x^{40}+\alpha^{245}x^{41}+\alpha^{185}x^{42}+$$
$$\alpha^{228}x^{43}+\alpha^3x^{44}+\alpha^{130}x^{45}+\alpha^{219}x^{46}+\alpha^{113}x^{47}+$$
$$\alpha^{167}x^{48}+\alpha^{191}x^{49}+\alpha^{32}x^{50}+\alpha^{131}x^{51}+\alpha^{92}x^{52}+$$
$$\alpha^{244}x^{53}+\alpha^{169}x^{54}+x^{55}$$

Figure 6:
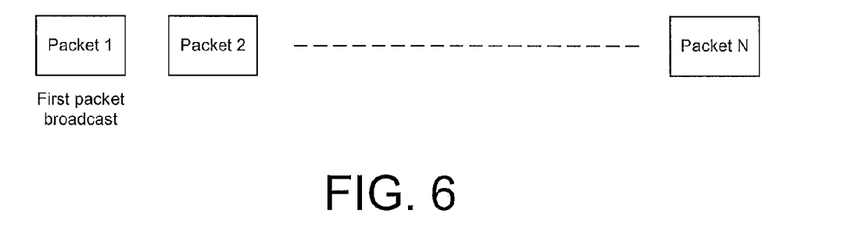
FIG. 6 is a block diagram of a representative firmware download broadcast.

In accordance with the presently disclosed subject matter, further improvements have been made to permit significant improvement in the lost packet recovery aspects of broadcast firmware updates. Thus, in accordance with the presently disclosed subject matter as generally illustrated in present FIG. 6, in order to download a new firmware version into the endpoints of the wireless LAN, the firmware is broken down into small packets that can be sent via an air (wireless) interface. Each one of these packets is sent to the whole network with a broadcast mechanism, Packets sent (broadcast) in this way are not acknowledged. In order to make sure that all the endpoints receive all the packets of the broadcast, the broadcast procedure is configured for a very high degree of reliability.

To make the broadcast very reliable, the packets are relayed through the network with a sufficient number of repetitions. Randomization windows for transmission are also chosen to be large enough to avoid the loss of too many packets through internal collisions. The pace of successive broadcasts is chosen to be slow enough to avoid interference between successive packets.

After the completion of the broadcast, the applicative layer checks the integrity of the download in each endpoint. Missing packets are then retransmitted, either individually to the endpoints which have reported the packet to be missing, or with another broadcast if the packet is missing in too many endpoints.

Such kind of firmware download gives good results but is not the fastest way to make a firmware download. Reasons for these shortcomings include: sending a very large number of packets to a very large number of endpoints with a high success rate requires a very reliable broadcast. The broadcast needs to be slowed down to achieve this reliability. Retransmission of missing packets takes time because different packets are missing in different endpoints and a lot of packets might need to be retransmitted before the firmware is complete in every endpoint.

In accordance with the presently disclosed subject matter, to speed up the firmware download the following mechanisms have been provided. The process to provide such improved download efficiency is elegantly simple in that the process provides for appending some redundancy packets to the firmware download. Such redundant packets will allow each endpoint to compute the missing packets if not too many packets are lost.

Figure 7:
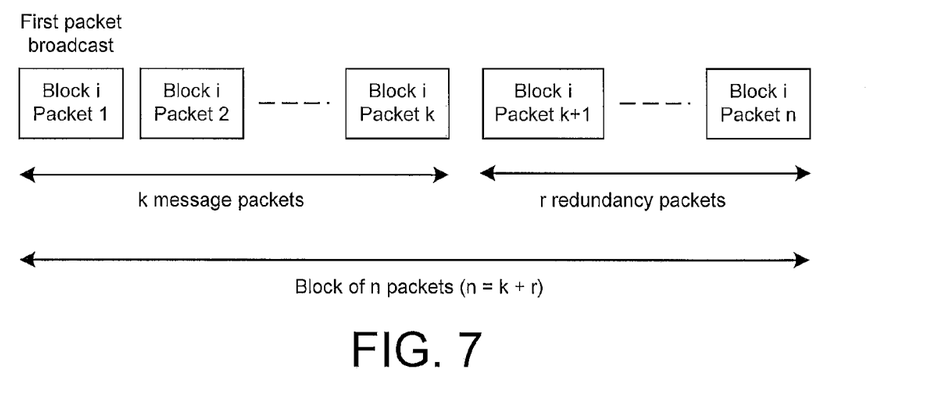
FIG. 7 is a block diagram illustrating an exemplary block of packets including redundant packets provided for packet recovery in accordance with the presently disclosed subject matter.

For this purpose, and with reference to present FIG. 7, the download blocks are broken down into blocks of k packets. The block size may be optimized for specific situations but for present discussion systems using blocks of 240 packets may be employed as a good starting point. This means that in an exemplary configuration three to four blocks will be enough to download a complete version of the firmware. The amount of redundancy may also be optimized based on the particular network but preliminary estimations indicate that a redundancy of 5% gives good results. FIG. 7 illustrates the structure of a block of packets per the presently disclosed subject matter.

Figure 8:
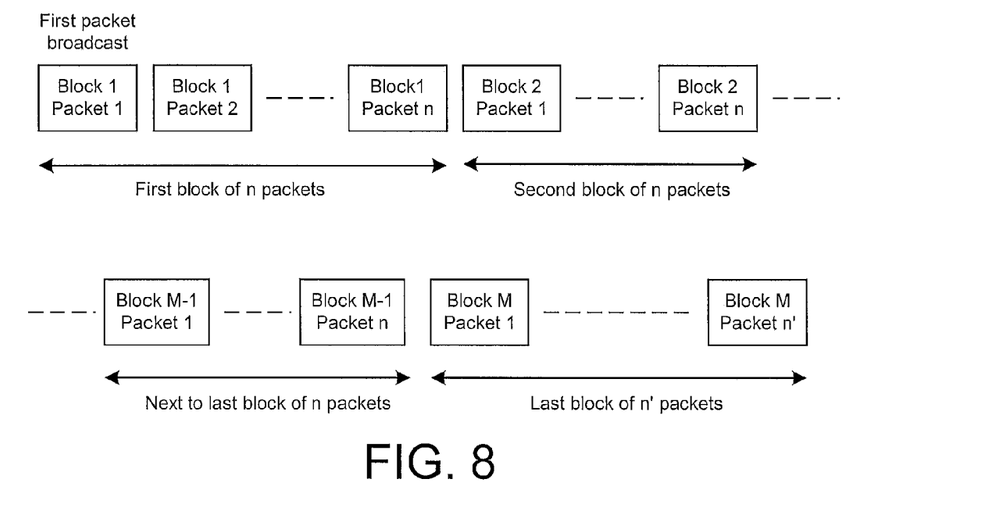
FIG. 8 is a block diagram illustrating a block of packets including redundant packets provided for lost packet recovery in accordance with the presently disclosed subject matter.

With reference to present FIG. 8, there is illustrated the successive broadcast of all the blocks for a complete firmware download. Each of the blocks contains n packets except that the last block may be shorter, that is, it may be adjusted, to fit the exact number of packets that need to be downloaded.

Figure 9:
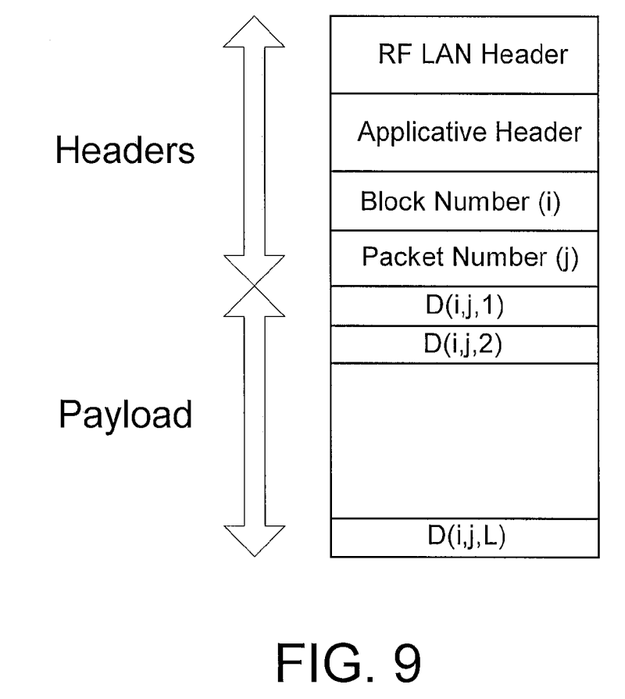
FIG. 9 is a block diagram illustrating the contents of an exemplary firmware download packet in accordance with the presently disclosed subject matter.

Present FIG. 9 shows the internal structure of an exemplary single packet. The payload is a succession of symbols $D(i,j,l)$, that will be bytes in most situations but it is possible to use shorter or longer symbols. The L symbols $D(i,j,l)$, $1 \leq l \leq L$, form the payload of the packet.

If one considers all the symbols in position l of the packets of block i, there is the following sequence:

$$\{D(i,1,l), D(i,2,l), D(i,3,l), \ldots D(i,n,l)\},$$
for $l=1,2,\ldots,L$ and $i=1,2,\ldots,M-1$ The redundancy symbols, $D(i,j,l)$, $k+1 \leq j \leq n$, are chosen in such a way that this sequence of n symbols is a word of the Reed-Solomon code $C(n,k)$. It then becomes very easy to recompute a missing packet with the error correction capability of the Reed-Solomon code.

In this instance, the Reed-Solomon decoding involved here is an erasure procedure. Erasure decoding requires much less computation and allows the recovery of twice as many packets, compared to the standard Reed-Solomon decoding. This is made possible because in such case, it is known beforehand which packets need to be recovered. Such is a much simpler problem than finding the location of an unknown error and then correcting the error. For the last, shorter packet, a similar procedure can be applied.

$$\{D(i,1,l), D(i,2,l), D(i,3,l), \ldots D(i,n',l)\},$$
for $l=1,2,\ldots,L$ and $i=M$ The firmware download with lost packet recovery in accordance with the presently disclosed subject matter is much faster than previous techniques because: if no lost packet recovery is possible, the broadcast has to be slowed down to make sure that every packet is received by every endpoint.

Only a small redundancy overhead allows the endpoints to compute several lost packets. This allows a much faster broadcast pace because the system is now fault tolerant.

In accordance with further aspects of the presently disclosed subject matter other improvements over the just described lost packet recovery technique have also been provided. Generally it is expected that the performance of a broadcast strongly depends on the propagation conditions, endpoint density and ongoing traffic in the network. With no prior knowledge of the network and no feedback mechanism, the performance of the broadcast is unknown. One solution is to always send the broadcasts with a maximum efficiency configuration in order to minimize retransmissions. In accordance with such aspect of the presently disclosed subject matter, a feedback mechanism is provided that adapts the broadcast to the actual network.

The first step in such presently disclosed adaptive process is identical to the previously described firmware download with lost packet recovery. After the completion of a block broadcast, the endpoints try to compute missing packets within the block and report the result of their computations reported to the cell relay. If the block has been successfully received, the broadcast of the next block can begin. If some packets are missing within the block, the cell relay will proceed with the broadcast of additional redundancy packets. The benefit of this is that there is no need to retransmit the missing packets which will be different for each endpoint. The additional redundancy packets bring extra information that can be used by any endpoint, whatever the missing packets are.

Figure 10:
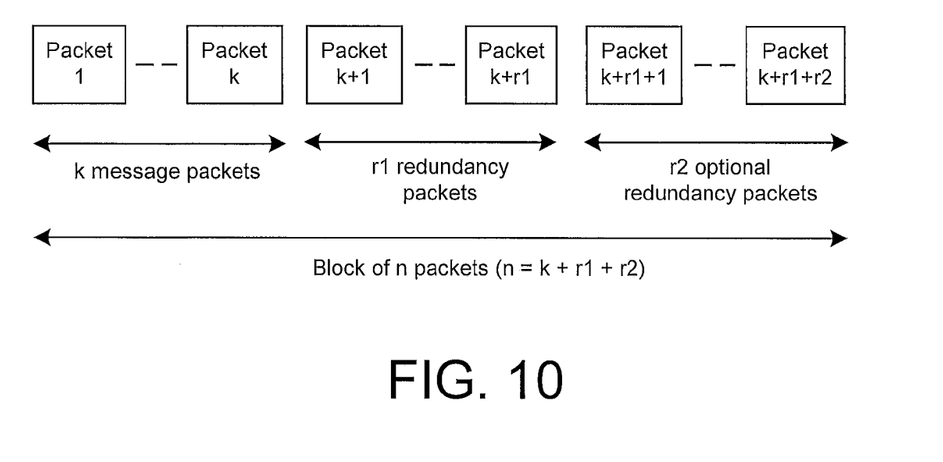
FIG. 10 is a block diagram of a block of packets as may be employed to provide adaptive packet recovery in accordance with the presently disclosed subject matter.

FIG. 10 is a diagram illustrating the procedure wherein blocks of n packets are broadcast where n is the number of message packets plus the number of redundancy and optional redundancy packets.

Figure 11:
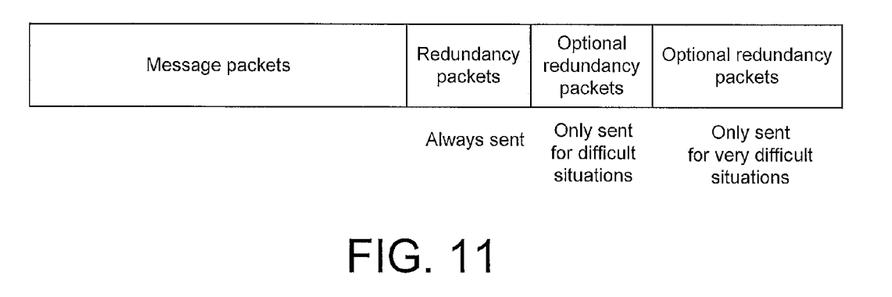
FIG. 11 is a block diagram of a block of packets as may be employed to provide three-step adaptive packet recovery in accordance with the presently disclosed subject matter.

Such presently disclosed process can be extended to have several steps as illustrated, for example, in the three-step adaptive packet recovery process shown in FIG. 11. If the first r1 redundancy packets are not enough to allow computation of the missing packets, the cell relay can decide to send r2 additional redundancy packets or to send r2+r3 additional redundancy packets if the broadcast performance has been very poor. The cell master can also decide to retransmit the whole block if this seems appropriate. Such decision preferably will be based on the knowledge of the broadcast success rate gained from the initial block transmission. From an estimation of the broadcast success rate, it is straightforward to evaluate the necessary number of redundancy packets.

Figure 12:
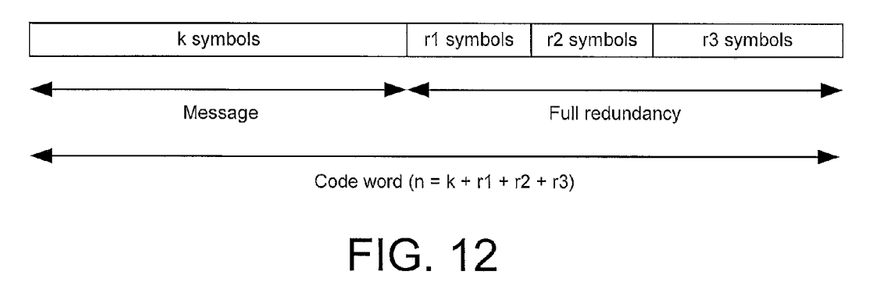
FIG. 12 illustrates representative Reed-Solomon code structure as may be employed for three-step adaptive packet recovery in accordance with the presently disclosed subject matter.

For proper operation, such process uses the same Reed-Solomon code for all the steps. In such way, the redundancy packets bring incremental information to the endpoints. At each step, the endpoint can use the previously transmitted redundancy packets as well as the newly received redundancy packets. Therefore, per presently disclosed subject matter, one starts with the maximum number of redundancy packets and choses the code to be C(n,k) with $n-k=r_1+r_2+r_3$ being the maximum FEC length as illustrated in FIG. 12. Such code can compute $r=r_1+r_2+r_3$ missing packets.

Figure 13:
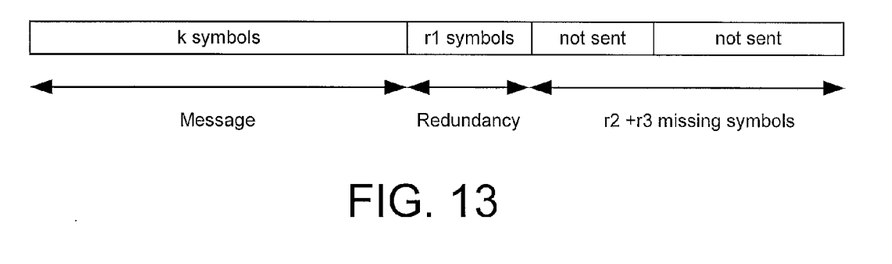
FIG. 13 illustrates representative Reed-Solomon code structure as may be employed for the first phase of a three-step adaptive packet recovery process in accordance with the presently disclosed subject matter.

As illustrated in FIG. 13, during the initial block broadcast, only $r_1$ redundancy symbols are sent. The endpoint will have in the best conditions $r_2+r_3$ missing symbols. The recovery capacity of $r_1+r_2+r_3$ symbols will be reduced to $r_1$ symbols, as expected from a standard Reed-Solomon code.

Figure 14:
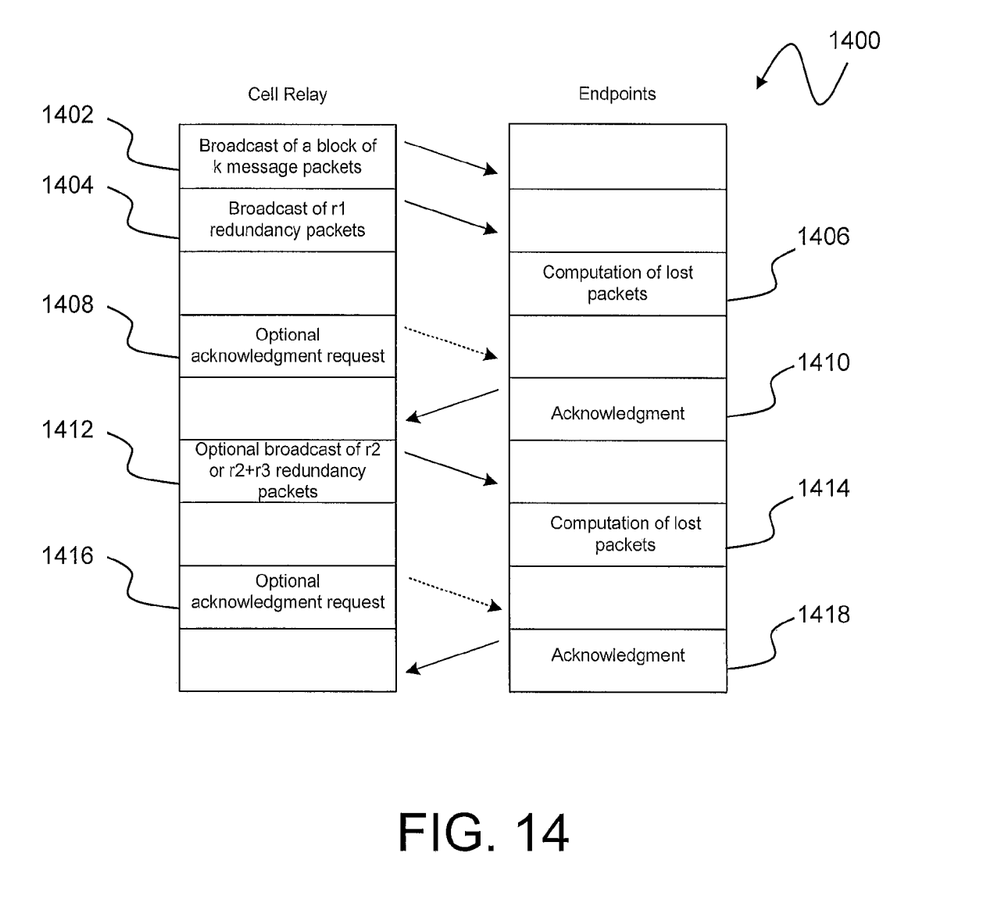
FIG. 14 is a flow chart representing a firmware download process including multi-step adaptive packet recovery in accordance with the presently disclosed subject matter.

FIG. 14 illustrates an exemplary multi-step adaptive packet recovery algorithm generally 1400 in accordance with the presently disclosed subject matter including several optional steps thereof. As may be seen from FIG. 14, exemplary multi-step adaptive packet recovery algorithm 1400 provides in a first step 1402 that the Cell Relay Broadcasts a block of k message packets to the various endpoints in the network. Such step is followed by step 1404 where the Cell Relay broadcasts r1 redundancy packets to the endpoints. At step 1406, the various endpoints will compute any lost packets. At step 1408, the Cell Relay may send an optional acknowledgment request to the endpoints. Meanwhile, the endpoints will have completed their computations and, if the optional acknowledgment request has been sent, respond to such request at step 1410 and also report the number of packets successfully received and the result of the packet recovery computation. If the lost packets cannot all be computed, the cell relay will broadcast additional redundancy packets at step 1412. At step 1414, the endpoints will again compute lost packets and, in addition to responding to another optional acknowledgment request (step 1416), the endpoints will at step 1418 acknowledge any optional acknowledgment request and report the number of packets successfully received and the result of the packet recovery computation.

Those of ordinary skill in the art should appreciate that multi-step process 1400 may be extended to include more than the three basic steps illustrated in FIG. 14 by providing additional optional broadcasts similar to those of step 1412 along with additional calculating, acknowledging, and reporting steps similar to steps 1410, 1414, and 1418. Such repeated steps may be performed up to a predetermined maximum number of times with the Reed-Solomon code word initially adjusted to correspond to the predetermined maximum number of times and the associated total number of symbols, both message and redundancy, to be sent.

Figure 15:
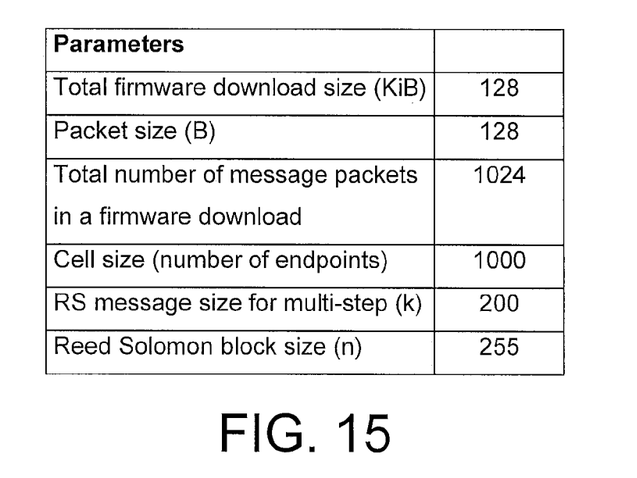
FIG. 15 is a table of exemplary parameters useful for evaluating statistical and CPU requirements estimations.

As an aid to implementing the presently disclosed subject matter, FIG. 15 provides a table summarizing parameters used for statistical requirements estimations.

Figure 16:
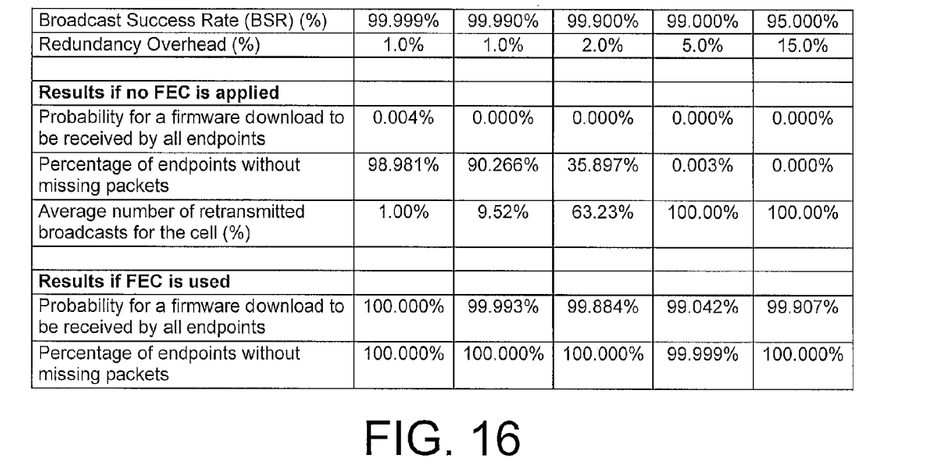
FIG. 16 is a table illustrating exemplary probabilities of success for single-step packet recovery as relates to presently disclosed subject matter.
Figure 17:
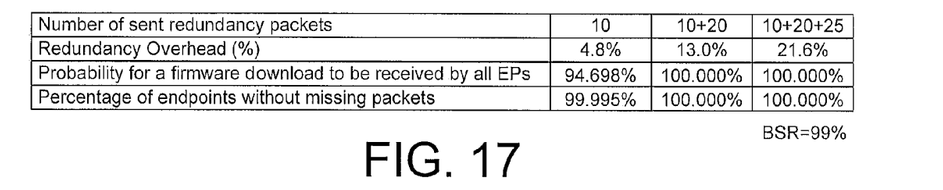
FIG. 17 is a table illustrating exemplary probabilities of success for three-step packet recovery with a Broadcast Success Rate (BSR) of 99% as relates to presently disclosed subject matter.
Figure 18:
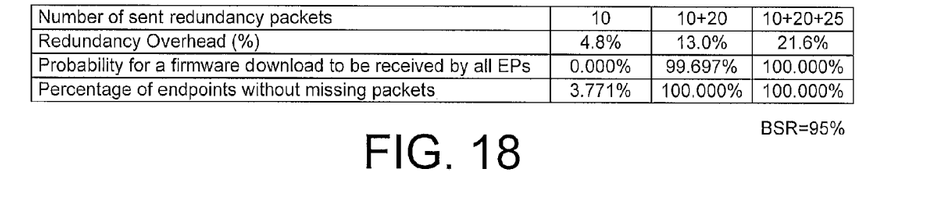
FIG. 18 is a table illustrating exemplary probabilities of success for three-step packet recovery with a Broadcast Success Rate (BSR) of 95% as relates to presently disclosed subject matter.
Figure 19:
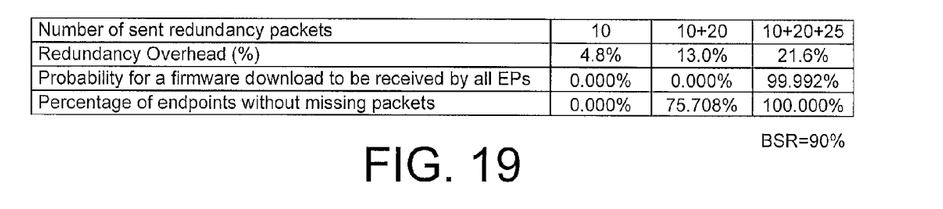
FIG. 19 is a table illustrating exemplary probabilities of success for three-step packet recovery with a Broadcast Success Rate (BSR) of 90% as relates to presently disclosed subject matter.

FIG. 16 provides a table illustrating gain expected from using FEC for a single-step packet recovery process as opposed to results expected where no FEC is applied. The Broadcast Success Rate (BSR) is defined as the probability for a single broadcast packet to be received by any given endpoint. It can be seen that only a small overhead can improve the success rate dramatically. A multi-step adaptive firmware download can cope with a very large range of environments. FIGS. 17-19 illustrate the probability of success for three-step adaptive recovery with Broadcast Success Rates (BSRs) of 99%, 95%, and 90%, respectively.

Simulation results for the presently disclosed subject matter have shown that with a 10% redundancy, the total firmware download time can be expected to be reduced by a factor between two and four using a single-step process. By implementation of the presently disclosed subject matter, lost packet recovery makes the firmware download much faster as the small redundancy overhead allows a fast broadcast pace with the computation of lost packets by the endpoint itself.

Similarly, multi-step adaptive lost packet recovery provides further improvement since additional redundancy is used only in difficult environments and the normal firmware download is not slowed down if the propagation conditions are normal. Further retransmission of lost packets is replaced by transmission of additional redundancy packets. As those are the same for all endpoints, the total time dedicated to retransmission is dramatically reduced; accordingly, there is no need to address packets to individual endpoints. As a consequence, the multi-step procedure in accordance with the presently disclosed subject matter can cope with a very wide range of environments, up to the most difficult ones, thereby significantly increasing overall reliability.

What is claimed is:

1. A method for downloading firmware, comprising:
dividing an image of firmware to be downloaded into a plurality of blocks, each block containing a plurality of packets;
broadcasting, by at least one transmitting apparatus, the plurality of blocks;
appending at least one redundancy packet to the broadcast of each of the plurality of blocks; and
computing missing packets within the blocks based on the at least one redundancy packet;
wherein the last block of the plurality of blocks is adjusted in length to fit an exact number of packets to be downloaded.

2. A method as in claim 1, wherein the number of redundancy packets is a percentage of the total number of packets broadcast.

3. A method as in claim 2, wherein the percentage is about 5%.

4. A method as in claim 1, wherein the combined length of the plurality of packets and the at least one redundancy packet corresponds to the length of a forward error correcting code word.

5. A method as in claim 4, wherein the forward error correcting code word is a Reed-Solomon code word.

6. A method as in claim 5, wherein computing missing packets comprises Reed-Solomon decoding using an erasure procedure.

7. A method as in claim 1, further comprising:
reporting computation of missing packet results; and
broadcasting at least one additional redundancy packet based on the reported results.

8. A method as in claim 7, wherein each broadcast and computation step uses the same Reed-Solomon code.

9. A method as in claim 8, wherein the Reed-Solomon code is based on a predetermined maximum number of packets to be broadcast.

10. A method as in claim 1, further comprising sending an acknowledgment request.

11. A method for transferring software, comprising:
dividing the software into a plurality of blocks, each block containing a plurality of packets;
establishing a predetermined maximum number of redundancy packets to be downloaded with the plurality of packets;
setting a forward error correction code word to a length equal to that of the total of the plurality of software packets and the predetermined maximum number of redundancy packets;
transferring, by at least one transmitting apparatus a first block of a subset of the plurality of software packets;
transferring a first block of a subset of the predetermined maximum number of redundancy packets; and
computing missing software packets based on the first block of the subset of redundancy packets using the forward error correction code word.

12. A method as in claim 11, wherein the forward error correction code word is a Reed-Solomon code word.

13. A method 11 as in claim 12, further comprising:
transferring at least one second block of a subset of the predetermined maximum number of redundancy packets; and
computing missing software packets based on the first and at least one second blocks of the subsets of redundancy packets.

14. A method as in claim 11, wherein the predetermined maximum number of redundancy packets is a percentage of the total number of software packets to be transferred.

15. A method as in claim 14, wherein the percentage is about 5%.

16. In a wireless mesh network including a head end and at least one cell relay configured to provide communications between the head end and one or more endpoints, a method for updating endpoint firmware, comprising:
dividing an image of firmware to be downloaded into a plurality of blocks, each block containing a plurality of packets;
broadcasting, by at least one transmitting apparatus the plurality of blocks;
appending at least one redundancy packet to the broadcast of each of the plurality of blocks;
computing missing packets within the block based on the at least one redundancy packet;
reporting computation of missing packet results to the cell relay; and
broadcasting, by at least one transmitting apparatus, from the cell relay at least, one additional redundancy packet based on the reported results.

17. A method as in claim 16, wherein the number of redundancy packets is a percentage of the total number of packets broadcast.

18. A method as in claim 17, wherein redundancy is about 5%.

19. A method as in claim 16, wherein the plurality of packets is broadcast from the cell relay to the one or more endpoints.

20. A method as in claim 16, wherein the last block of the plurality of blocks is adjusted in length to fit an exact number of packets to be downloaded.

21. A method as in claim 16, wherein the combined length of the plurality of packets and the at least one redundancy packet corresponds to the length of a forward error correcting code word.

22. A method as in claim 21, wherein the forward error correcting code word is a Reed-Solomon code word.

23. A method as in claim 22, wherein computing missing packets comprises Reed-Solomon decoding using an erasure procedure.

24. A method as in claim 16, wherein each broadcast and computation step uses the same Reed-Solomon code.

25. A method as in claim 24, wherein the Reed-Solomon code is based on a predetermined maximum number of packets to be broadcast.

26. A method as in claim 16, further comprising sending an acknowledgment request from the cell relay.

27. A method as in claim 16, wherein at least one of the endpoints comprises a meter.

* * * * *

UNITED STATES PATENT AND TRADEMARK OFFICE
CERTIFICATE OF CORRECTION

| | | |
|---|---|---|
| PATENT NO. | : 8,787,210 B2 | Page 1 of 1 |
| APPLICATION NO. | : 13/833252 | |
| DATED | : July 22, 2014 | |
| INVENTOR(S) | : Gilles Picard | |

It is certified that error appears in the above-identified patent and that said Letters Patent is hereby corrected as shown below:

In the Claims

In Column 13, line 51, please insert a --,-- after the word "apparatus";

In Column 14, line 1, please delete the numeral "11" after the word "method", and after the word "claim", please delete the numeral "12" and replace with the numeral "11";

In Column 14, line 19, please insert a --,-- after the word "apparatus"; and

In Column 14, line 28, please delete the "," after the words "at least".

Signed and Sealed this
Twentieth Day of January, 2015

Michelle K. Lee
*Deputy Director of the United States Patent and Trademark Office*